United States Patent
Ogata et al.

Patent Number: 5,322,542
Date of Patent: Jun. 21, 1994

[54] METHOD OF AND APPARATUS FOR CHAMFERING EDGE OF GLASS VESSEL

[75] Inventors: Haruhiko Ogata, Kanagawa; Hidetoshi Komiya, Tokyo; Fumio Oguni, Kyoto, all of Japan

[73] Assignee: Toyo Glass Company Limited, Tokyo, Japan

[21] Appl. No.: 977,878

[22] Filed: Nov. 17, 1992

[30] Foreign Application Priority Data

Nov. 22, 1991 [JP] Japan .................. 3-334190

[51] Int. Cl.⁵ ............... C03B 29/00; C03B 23/04
[52] U.S. Cl. ........................ 65/102; 65/104; 65/111; 65/120; 65/274; 65/292; 65/355; 219/383; 373/36
[58] Field of Search ............ 65/284, 292, 120, 274, 65/65, 269, 102, 104, 111, 252, 355; 219/383; 373/36, 37

[56] References Cited

U.S. PATENT DOCUMENTS

| | | | |
|---|---|---|---|
| 916,959 | 3/1909 | Cummins | 65/284 |
| 2,306,054 | 12/1942 | Guyer | 65/120 |
| 2,422,482 | 6/1947 | Guyer | 65/284 |
| 2,428,969 | 10/1947 | Guyer | 219/383 |
| 2,693,498 | 11/1954 | Penberthy | 373/37 |
| 3,252,779 | 5/1966 | Rexford | 65/284 |
| 3,398,228 | 8/1968 | Blumenfeld | 373/37 |
| 3,634,588 | 1/1972 | Steitz | 373/37 |
| 3,816,087 | 6/1974 | Van Duuren et al. | 65/152 |
| 3,922,156 | 11/1975 | Martin | 65/120 |
| 3,967,047 | 6/1976 | Long et al. | 373/37 |
| 4,165,228 | 8/1979 | Ebata et al. | 65/104 |

FOREIGN PATENT DOCUMENTS 62-28096  6/1987  Japan .

*Primary Examiner*—W. Gary Jones
*Assistant Examiner*—Steven P. Griffin
*Attorney, Agent, or Firm*—Sughrue, Mion, Zinn, Macpeak & Seas

[57] ABSTRACT

A glass vessel edge chamfering method and apparatus wherein heat energy can be controlled readily and chamfering of a glass vessel having a deformed profile, local chamfering and simultaneous processing of the opposite inner and outer sides of a lip of a vessel can be performed readily and besides the efficiency in consumption of energy necessary for chamfering for one glass vessel is improved so that a glass vessel can be processed efficiently in a short time. A pair of positive and negative electrodes are opposed in a predetermined spaced relationship to an edge of a glass vessel, and flame is blown from a pair of burners into gaps between the edge of the glass vessel and the electrodes while a high voltage is applied between the electrodes. Thereupon, electric current flows between the electrodes and the glass vessel by way of the flame and heats the glass vessel by Joule heat when the electric current flows through the glass vessel.

6 Claims, 4 Drawing Sheets

METHOD OF AND APPARATUS FOR CHAMFERING EDGE OF GLASS VESSEL

BACKGROUND OF THE INVENTION

1. Field of the Invention

This invention relates to a glass vessel edge chamfering method and apparatus wherein an edge such as a lip or a bottom edge of a glass vessel produced by press molding or blow molding is heated into a softened condition to round the edge in order to remove an angle from the edge.

2. Description of the Prior Art

A glass vessel molded by press molding such as, for example, a piece of glass tableware is liable to have an angle at a lip thereof which corresponds to a Joining line between a body die and a plunger ring of a molding machine. Therefore, after molding of the glass vessel, finishing processing called fire-polishing is normally performed wherein the lip of the glass vessel is heated with a flame of a burner into a softened condition to chamfer the same.

Various fire polishing methods are conventionally known. A popular conventional fire polishing method is to set a glass vessel in position below a ring-shaped burner and apply a flame from the ring-shaped burner to the entire circumference of the lip of the glass vessel to fire polish the entire lip at one time. Another popular conventional fire polishing method is to apply flame from a burner to a lip portion of a glass vessel while rotating the glass vessel at a position very near to the burner which is in the form of a straight pipe and is set in position to fire polish the edge of the glass vessel. A further fire polishing method is disclosed in Japanese Patent Publication Application No. 62-28096 wherein a lip of a glass vessel is fire polished with flame from a burner in the form of a straight pipe while cooling air is blown to the lip of the glass vessel to prevent possible deformation of the lip of the glass vessel by the fire-polishing.

The conventional fire polishing methods described above wherein flame from a burner is applied directly to the lip of a glass vessel to fire polish the lip have various associated problems as described below:

(1) Since the distance between the lip and flame is not fixed, irregular fire polishing may result.

(2) Since the degree of fire polishing varies widely depending upon the intensity of the flame of the burner or the time over which the flame is applied to the lip, it is difficult to control heat energy.

(3) Chamfering processing of a glass vessel having a deformed profile or local chamfering processing is not easy.

(4) Since the thermal efficiency is generally low and the heating time for one glass vessel is several tens of seconds and longer, a great number of workpieces must be processed at a time in mass production, and consequently, the equipment for the fire polishing (chamfering) step is large in scale and expensive.

(5) Radiation of a great amount of heat has a bad influence upon the operational environment thereraround.

SUMMARY OF THE INVENTION

It is an object of the present invention to provide a glass vessel edge chamfering method and apparatus wherein heat energy can be readily controlled.

It is another object of the present invention to provide a glass vessel edge chamfering method and apparatus wherein chamfering of a glass vessel having a deformed profile, local chamfering and simultaneous processing of the opposite inner and outer sides of a lip of a vessel can be readily performed.

It is a further object of the present invention to provide a glass vessel edge chamfering method and apparatus wherein the consumption of energy necessary for chamfering one glass vessel is improved and a glass vessel can be processed efficiently in a short time.

It is a still further object of the present invention to provide a glass vessel edge chamfering method and apparatus which improves the operational environment around the processing location.

In order to attain the objects, according to one aspect of the present invention, there is provided a method of chamfering an edge of a glass vessel, which comprises the steps of placing a glass vessel in position such that an edge thereof is opposed in a predetermined spaced relationship to a pair of positive and negative electrodes, applying a high voltage between the electrodes, and simultaneously blowing a flame from a pair of burners to gaps between the edge of the glass vessel and the electrodes. Preferably, the chamfering method further comprises the step of preheating, after the placing step, the edge of the glass vessel. Preferably, the flame is blown in in a direction perpendicular to the direction in which electric current flows between the electrodes and the edge of the glass vessel. Preferably, at the voltage applying step and the flame blowing step, the glass vessel is rotated around an axis thereof.

According to another aspect of the present invention, there is provided an apparatus for chamfering an edge of a glass vessel, which comprises rotating means for receiving a glass vessel thereon and rotating the glass vessel around an axis thereof, a pair of positive and negative electrodes opposed in a predetermined spaced relationship to an edge of the glass vessel, a high voltage source for applying a high voltage between the positive and negative electrodes, and a pair of burners for blowing a flame into gaps between the edge of the glass vessel and the positive and negative electrodes in directions perpendicular to the direction in which electric current flows between the electrodes and the edge of the glass vessel. Preferably, the chamfering apparatus further comprises preheating means for preheating the edge of the glass vessel received on the rotating means. Preferably, the chamfering apparatus further comprises a pair of conductive heat resisting capsules in which the electrodes are individually disposed, and means for continuously supplying cooling air into the conductive heat resisting capsules.

In the glass vessel edge chamfering method and apparatus, it is first confirmed that a glass vessel as an object for chamfering is at a temperature sufficiently high to allow electric current to flow through the glass material thereof. When the glass vessel has Just been molded and has sufficient residual heat, it may be chamfered as it is since the glass material thereof has a sufficiently high electric conductivity. However, when the glass vessel is cooled to a temperature at which a sufficiently high electrical conductivity is not obtained, edge of the glass vessel to be chamfered is preheated to such a sufficiently high temperature as described above. The glass vessel having such a sufficiently high temperature is placed in position, and a high voltage is applied between the positive and negative electrodes while a flame is blown into the gaps between the electrodes and the edge of the glass vessel. Consequently, electric current flows from the positive electrode to the glass material of the glass vessel by way of the flame and then through the glass material and finally from the glass material to the negative electrode by way of the flame. When the electric current flows through the glass material of the glass vessel, the glass material is heated from the inside by Joule heat generated by the electric current so that it is softened sufficiently to remove an angle therefrom to present a rounded shape.

If a spark takes place between an electrode and the edge of the glass vessel, the metal material of the electrode may be melted and partly removed as metal particles, and the metal particles thus produced tend to enter the glass material of the glass vessel which is in a softened condition. In this instance, if the direction of the flame of the burner is the same as the direction in which the electric current flows between the electrode and the edge of the glass vessel, then the flame will carry the metal particles toward the edge of the glass vessel to help the metal particles to be mixed into the glass material of the glass vessel. Such mixture of metal particles into the glass material of the glass vessel can be prevented by disposing the burners such that the flames therefrom are blown into the gaps between the edge of the glass vessel and the positive and negative electrodes in the directions perpendicular to the direction in which electric current flows between the electrodes and the edge of the glass vessel.

With the glass vessel edge chamfering method and apparatus, since electric current flows between the electrodes and the glass material of the glass vessel by way of flame applied from the burners so that the glass material of the glass vessel is heated from the inside thereof by Joule heat generated by the electric current, the following various advantages can be achieved compared with the conventional glass vessel edge chamfering methods and apparatus described above. First, the efficiency in consumption of energy required for chamfering processing of one glass vessel is improved and a glass vessel can be processed efficiently.

When a glass vessel having a non-circular shape is heated at a lip thereof only with flame while it is being rotated, the lip cannot be fire polished uniformly because the distance between the edge of the lip of the glass vessel and the flame varies as the glass vessel rotates. However, according to the present invention, the flame is used merely as a medium for flowing electric current therethrough, and since the glass material itself of the glass vessel is heated from the inside by Joule heat generated by the electric current which is allowed to flow through the glass material by the flame, the lip of the glass vessel can be fire polished uniformly.

Further, since only an aimed location of the glass vessel can be heated locally, particularly when a lower portion of the glass vessel is to be processed, it can be processed readily even if the profile is complicated or even if the glass vessel has a great thickness and is apt to be broken by thermal stress.

Furthermore, the degree of processing can be adjusted readily in accordance with the voltage to be applied across the electrodes or the energization period of time. Further, since the amount of heat radiation is reduced, the operational environment around the apparatus can be improved. Moreover, the opposite inner and outer sides of the edge of the glass vessel can be readily processed.

In addition, when the electrodes are individually disposed in the conductive heat resisting capsules and cooling air is continuously supplied into the heat resisting capsules to cool the electrodes, the electrodes can be protected from the flame and heat of the burners, which is effective to prevent the electrodes from being melted and partially removed and to increase the life of the electrodes.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
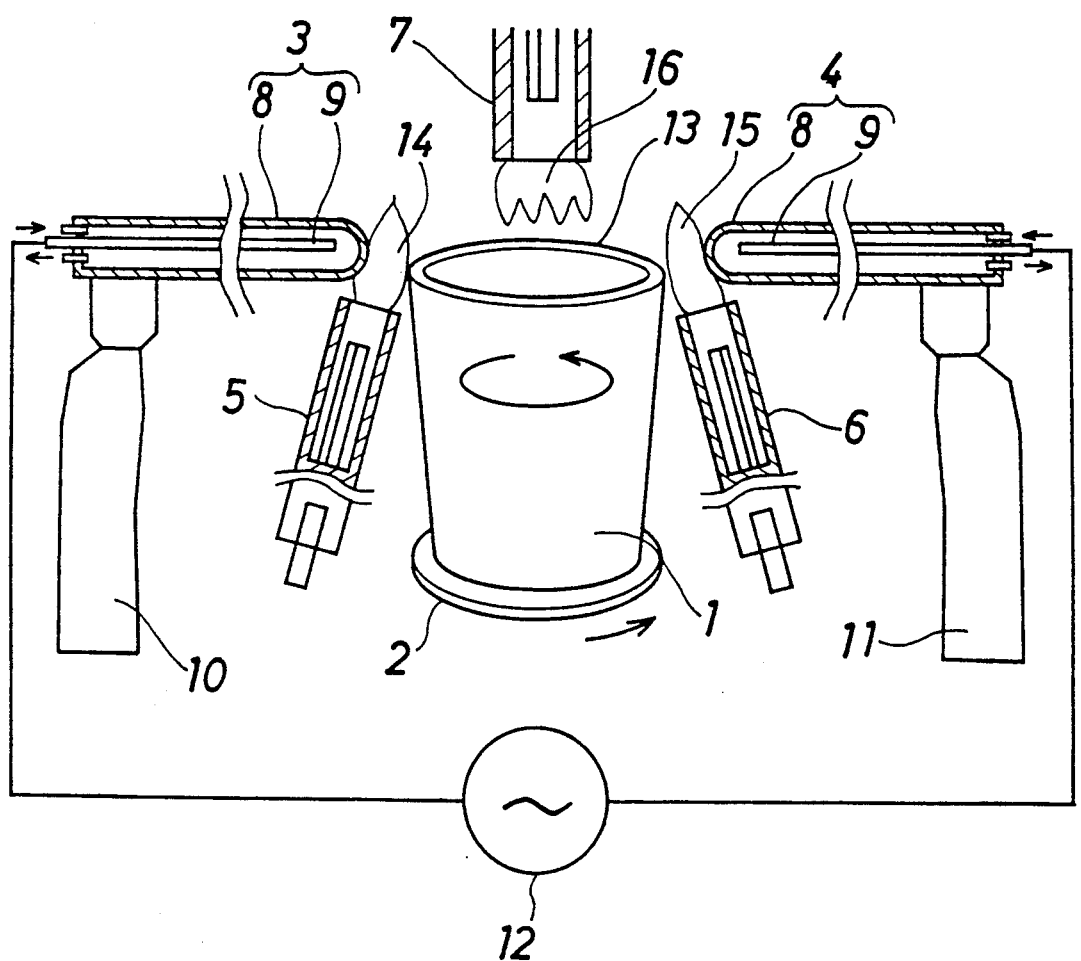
FIG. 1 is a schematic diagrammatic view illustrating a concept of a glass vessel edge chamfering method and apparatus according to the present invention.

Referring to FIG. 1, there is illustrated a concept of a glass vessel edge chamfering method and apparatus according to the present invention. Molded glass vessels 1 such as glasses are fed one by one to a predetermined position on a turntable 2, serving as rotating means, by a transporting mechanism not shown. A glass vessel 1 thus placed in position on the turntable 2 is positioned between a pair of electrode units 3 and 4 for the positive and negative electrodes which are disposed horizontally in an opposing relationship to each other above and around the turntable 2.

A pair of positive and negative energizing burners 5 and 6 are disposed around and above the turntable 2 corresponding to the positive and negative electrode units 3 and 4, and one or a plurality of preheating burners 7 are disposed above the turntable 2. The energizing burners 5 and 6 are positioned just below the electrodes 3 and 4, respectively, and the preheating burner or burners 7 are positioned intermediately between the positive and negative electrode units 3 and 4 in the direction of rotation of the turntable 2.

Each of the electrode units 3 and 4 includes a capsule 8 made of a metal having a high electrical conductivity and a high heat resisting property such as brass, and an electrode 9 having a suitable shape such as a bar-like shape, a plate-like shape or a needle-like shape and enclosed in the capsule 8. The electrode units 3 and 4 are supported on a pair of electrode holders 10 and 11, respectively, made of an insulating material. A high ac voltage of a high frequency or an ordinary frequency is applied between the electrodes 9 of the electrode units 3 and 4 from a high ac power source 12 of a high frequency or an ordinary frequency. Cooling air is continuously supplied into the capsules 8 of the electrode units 3 and 4 in order to cool the electrodes 9.

A lip 13 of the glass vessel 1 placed on the turntable 2 is positioned between the ends of the capsules 8 of the electrode units 3 and 4, and the glass vessel 1 is rotated in a horizontal plane by the turntable 2 with the lip 13 thereof spaced by a predetermined distance from the ends of the electrodes 9 of the electrode units 3 and 4.

The positive energizing burner 5 blows flame 14 upwardly from below to a gap between the end of the capsule 8 of the positive electrode unit 3 and the lip 13 of the glass vessel 1, and the negative energizing burner 6 blows flame 15 upwardly from below to a gap between the end of the capsule 8 of the negative electrode unit 4 and the lip 13 of the glass vessel 1. The flame 14 and 15 may be so weak that electric current flows between the electrode units 3 and 4 and the lip 13 of the glass vessel 1. It is to be noted that the energizing burners 5 and 6 may alternatively be disposed above the corresponding electrode units 3 and 4 so that the flame 14 and 15 may be blown in downwardly. The preheating burner or burners 7 blow flame 16 from above or from an oblique upper position or else sidewardly toward the lip 13 of the glass vessel 1 to heat the lip 13. The flame 16 from the burner or burners 7 is controlled so that it does not touch the glass vessel 1.

When the lip 13 of the glass vessel 1 is to be fire polished, the lip 13 of the glass vessel 1 is first preheated by the flame 16 of the preheating burner or burners 7 while the glass vessel 1 is being rotated by means of the turntable 2 until the glass material of the glass vessel 1 is heated to a temperature sufficient to conduct electricity therethrough. Then, while the glass vessel 1 is being rotated, a high ac voltage (for example, 2 to 3 KV) is applied between the electrodes 9 of the electrode units 3 and 4 and simultaneously the flame 14 and 15 is blown from the energizing burners 5 and 6 into the gap between the lip 13 of the glass vessel 1 and the end of the positive electrode unit 3 and the gap between the lip 13 and the negative electrode unit 4.

As a result, electric current flows through the glass material of the glass vessel 1 by way of the flame 14 and 15 of the energizing burners 5 and 6, and consequently, the lip 13 of the glass vessel 1 is heated from the inside thereof by Joule heat generated by the electric current. In particular, since the capsules 8 of the electrode units 3 and 4 are conductive and the flame 14 and 15 is present between the ends of the capsules 8 and the lip 13 of the glass vessel 1, electric current flows from the positive electrode 9 to the lip 13 by way of the capsule 8 of the positive electrode unit 3 and the flame 14 and then through the glass material of the lip 13 and further to the negative electrode 9 by way of the flame 15 and the capsule 8 of the negative electrode unit 4. Joule heat is generated by electric current flowing through the glass material of the lip 13, and the lip 13 is fire polished by the heat.

Accordingly, when compared with the conventional fire polishing methods wherein a lip of a glass vessel is fire polished with flame only from a burner, the intensity of the flame 14 and 15 can be made weak remarkably, and consequently, the time required for fire polishing can be decreased and the energy efficiency can be raised. The degree of fire polishing depends upon a heated condition, in short, the temperature, of the glass material. The temperature depends upon a value of electric current if the voltage is fixed. Accordingly, the degree of fire polishing can be adjusted readily by adopting the method wherein energization is stopped when a certain value of electric current is reached. Further, since the electric current is varied if the voltage applied between the electrodes 9 is varied, the degree of fire polishing can be adjusted by varying the voltage applied.

Further, since the flame 14 and 15 is blown from below in an intersecting relationship with the direction of electric current flowing between the electrodes 9 and the lip 13 of the glass vessel 1, it prevents fine metal particles, which are blown away in a molten condition from the metal materials of the electrode units 3 and 4, from moving toward the lip 13. Since the electrodes 9 are enclosed in the capsules 8 having a heat resisting property and are always cooled by cooling air, they are protected from the flame 14 and 15.

While the flame 16 of the preheating burner or burners 7 may be obtained by combustion of a mixture of combustible fuel gas and air, combustion of another mixture of combustible fuel gas and oxygen should be employed in order to decrease the preheating time. Further, the flame 14 and 15 of the energizing burners 5 and 6 is only required to assure electric conductivity between the electrodes 9 and the glass material of the glass vessel 1, and the characteristic of the combustion gas does not matter. While the material of the burners 5 and 6 is preferably a ceramic material having no electric conductivity, it may otherwise be a metal. Where the burners 5 and 6 are made of a metal, insulating members must be interposed between the burners 5 and 6 and the holders for the burners 5 and 6. While preheating by the preheating burner or burners 7 and fire polishing by the electrode units 3 and 4 and the energizing burners 5 and 6 are performed at the same location in the embodiment described above, they may otherwise be performed at separate locations. Further, when the glass vessel 1 has just been molded and still has sufficient residual heat, preheating is unnecessary.

According to an experiment conducted by the inventors, when a glass lip of which has a thickness of 2 mm or so was fire polished immediately after molding thereof, fire polishing was completed by energization for 3 to 5 seconds after preheating for 5 to 10 seconds with a flame by combustion of a mixture of combustible fuel gas and oxygen. The time required after starting of preheating till completion of energization was within 15 seconds and was reduced to about one half to one third comparing with conventional fire polishing only with a flame. Further, no foreign article sticking to the glass vessel was found, and the finish was splendid.

Figure 2:
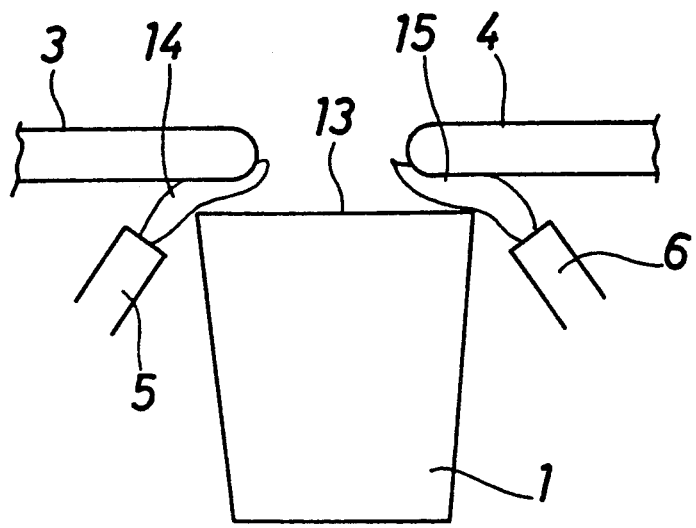
FIG. 2 is a schematic side elevational view illustrating a manner of processing wherein end portions of a pair of electrode units are positioned above a lip portion of a glass vessel.

FIGS. 2 to 7 illustrate different manners of and arrangements for the fire polishing operation. Referring first to FIG. 2, the electrode units 3 and 4 are disposed in an opposing relationship to each other such that end portions thereof are positioned just above the lip 13 of the glass vessel 1 placed in position on the turntable 2, and the energizing burners 5 and 6 are disposed such that the flame 14 and 15 therefrom is blown into the gaps upwardly from outwardly sidewardly of the lip 13.

Figure 3:
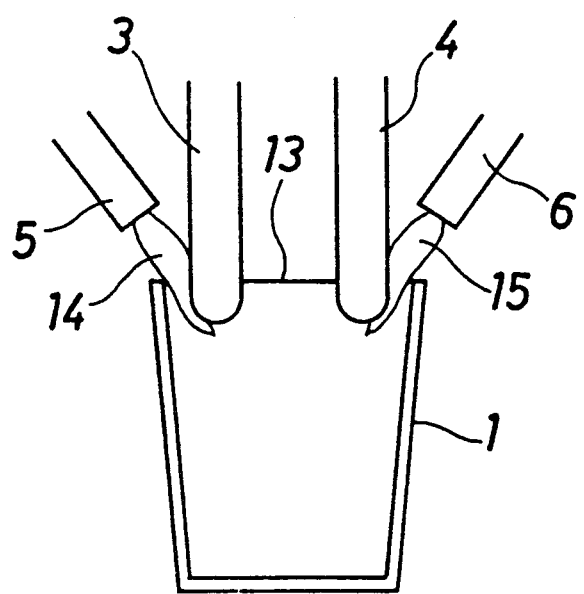
FIG. 3 is a similar view but illustrating another manner of processing wherein end portions of a pair of electrode units are positioned within a glass vessel and flame of a pair of burners is blown into the glass vessel from above.

Referring to FIG. 3, the electrode units 3 and 4 are directed downwardly and have end portions positioned in the glass vessel 1, and the energizing burners 5 and 6 are disposed such that the flame 14 and 15 is blown in from above to the inner side of the lip 13 so as to remove angles mainly on the inner side of the lip 13.

Figure 4:
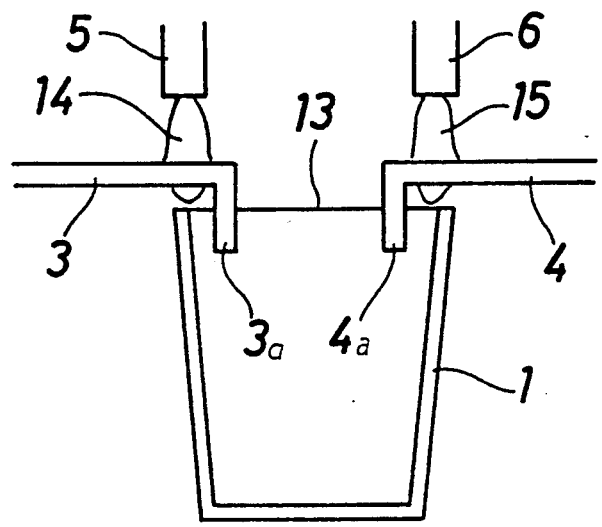
FIG. 4 is a similar view but illustrating a further manner of processing wherein a pair of electrode units each having a downwardly bent end portion are used.

Referring to FIG. 4, end portions 3a and 4a of the electrode units 3 and 4 are bent downwardly and positioned in the glass vessel 1, and the energizing burners 5 and 6 are directed downwardly such that the flame 14 and 15 therefrom is blown in from above to the inner side of the lip 13 of the glass vessel 1 so as to remove angles mainly on the inner side of the lip 13 similarly as in the arrangement shown in FIG. 3.

Figure 5:
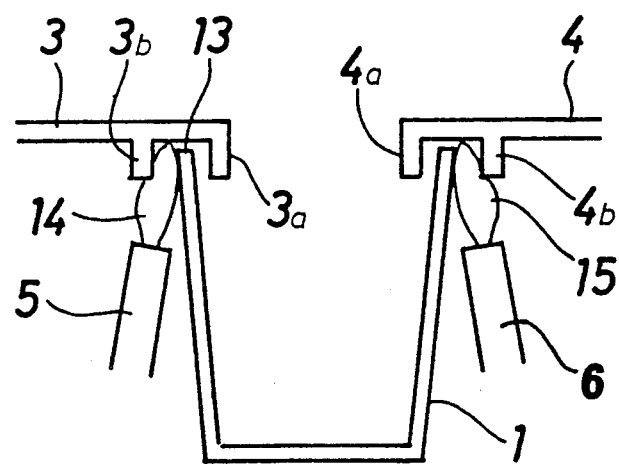
FIG. 5 a similar view but illustrating a still further manner of processing wherein a pair of electrode units each having a downwardly end portion and a depending portion opposing to the downwardly end portion are used.

Referring to FIG. 5, end portions 3a and 4a of the electrode units 3 and 4 are bent downwardly and depending portions or projections 3b and 4b are formed on the electrode units 3 and 4 in a predetermined spaced relationship from the bent end portions 3a and 4a, respectively. The electrode units 3 and 4 are disposed such that the lip 13 of the glass vessel 1 is positioned between the bent end portion 3a and the opposing depending portion 3b of the electrode unit 3 and between the bent end portion 4a and the opposing depending portion 4b of the electrode unit 4, and the energizing burners 5 and 6 are disposed such that the flame 14 and 15 therefrom is blown in to a gap between the bent end portion 3a and the depending portion 3b of the electrode unit 3 and another gap between the bent end portion 4a and the depending portion 4b of the electrode unit 4. In this instance angles on both of the inner and outer sides of the lip 13 can be removed at the same time.

Figure 6:
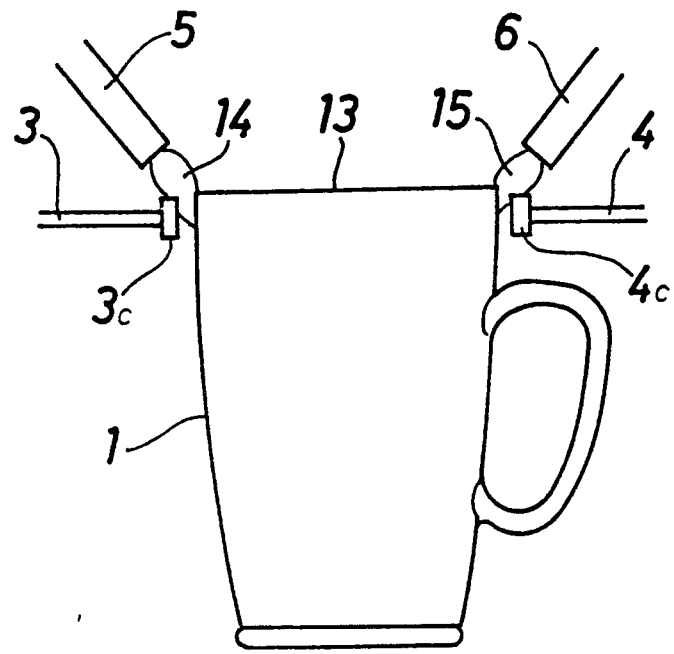
FIG. 6 is a similar view but illustrating a yet further manner of processing wherein a pair of electrode units each having a head at an end thereof are used.

Referring to FIG. 6, heads 3c and 4c each in the form of a disk or a rectangular plate are provided at the ends of the electrode units 3 and 4, respectively, and the energizing burners 5 and 6 are disposed such that the flame 14 and 15 therefrom heats locations of the glass vessel 1 a little lower than the lip 13 to chamfer the lip 13. The present arrangement is suitable to fire polish a glass vessel having a comparatively large thickness such as a jug.

Figure 7:
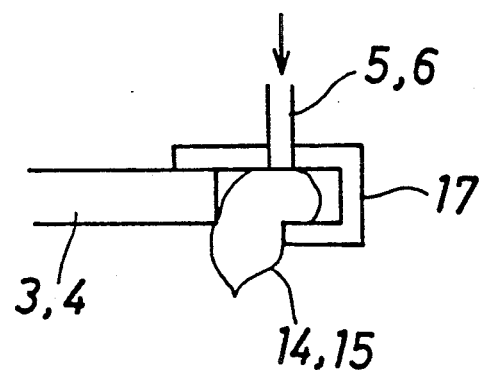
FIG. 7 is a schematic side elevational view illustrating a yet further manner of processing wherein an electrode unit having a cover of heat resisting glass attached to an end portion thereof is used.

Referring to FIG. 7, a C- or J-shaped cover 17 made of heat resisting glass such as silica glass is attached to an end portion of each of the electrode units 3 and 4, and the energizing burners 5 and 6 are held in a downwardly directed condition on the covers 17 of the electrode units 3 and 4, respectively. Thus, the flame 14 and 15 from the burners 5 and 6 is blown in to spacings between the ends of the electrode units 3 and 4 and the covers 17, respectively, in order to improve the contacting condition between the flame 14 and 15 and the ends of the electrode units 3 and 4. In this instance, the flame 14 and 15 passes between the ends of the electrode units 3 and 4 and the covers 17 toward the glass (not shown in FIG. 7). With the arrangement, energization can be achieved at a comparatively low voltage.

It is to be noted that, while the lip 13 of the glass 1 is chamfered in the arrangements described above, the present invention can be applied not only to chamfering of a lip of a glass vessel but also to chamfering of an edge of some other portion of a glass vessel such as chamfering of a circumferential edge of the bottom of a glass vessel.

Having now fully described the invention, it will be apparent to one of ordinary skill in the art that many changes and modifications can be made thereto without departing from the spirit and scope of the invention as set forth herein.

What is claimed is:

1. A method of chamfering an edge of a glass vessel, comprising the steps of:
   placing a glass vessel in position such that an edge of said glass vessel is positioned in a predetermined spaced relationship between a pair of positive and negative electrodes, said electrodes being opposed to each other;
   applying a high voltage between said electrodes; and simultaneously blowing a flame from a pair of burners to gaps between the edge of said glass vessel and said electrodes,
   wherein the flame is blown in a direction perpendicular to a direction in which electric current flows between said electrodes and the edge of the glass vessel so as to blow molten bits of said electrodes away from said glass vessel.

2. A chamfering method as claimed in claim 1, further comprising the step of preheating, after the placing step, the edge of the glass vessel.

3. A chamfering method as claimed in claim 1, wherein, at the voltage applying step and the flame blowing step, the glass vessel is rotated around an axis of said vessel.

4. An apparatus for chamfering an edge of a glass vessel, comprising:
   rotating means for receiving a glass vessel thereon and rotating the glass vessel around an axis of said vessel;
   a pair of positive and negative electrodes opposed to each other and positioned in a predetermined spaced relationship to an edge of the glass vessel with said edge of the glass vessel between said electrodes;
   a high voltage source for applying a high voltage between said positive and negative electrodes; and
   a pair of burners for blowing a flame into gaps between the edge of the glass vessel and said positive and negative electrodes in directions perpendicular to a direction in which electric current flows between said electrodes and the edge of the glass vessel so as to blow molten bits of said electrodes away from said glass vessel.

5. A chamfering apparatus as claimed in claim 4, further comprising preheating means for preheating the edge of the glass vessel received on said rotating means.

6. A chamfering apparatus as claimed in claim 4, further comprising a pair of conductive heat resisting capsules in which said electrodes are individually disposed, and means for continuously supplying cooling air into said conductive heat resisting capsules.

* * * * *